United States Patent
Boys (10) Patent No.: US 6,305,120 B1
(45) Date of Patent: *Oct. 23, 2001

(54) METHOD AND APPARATUS ENABLING REMOTE RELEASE OF HOOKS AND HOOK ASSEMBLIES TO FREE FISHING LURES

(76) Inventor: Mark A. Boys, 412 Carpenteria Rd., Aromas, CA (US) 95004

(*) Notice: Subject to any disclaimer, the term of this patent is extended or adjusted under 35 U.S.C. 154(b) by 0 days.

This patent is subject to a terminal disclaimer.

(21) Appl. No.: 09/708,302

(22) Filed: Nov. 7, 2000

Related U.S. Application Data (62) Division of application No. 09/290,462, filed on Apr. 12, 1999, now Pat. No. 6,189,256.

(51) Int. Cl.[7] .......................... A01K 85/00; A01K 85/02; A01K 97/24
(52) U.S. Cl. ......................... 43/43.12; 43/17.2; 43/26.2
(58) Field of Search ................. 43/4, 4.5, 17.2, 43/26.2, 26.1, 43.12; 441/2, 7; 367/2, 133, 197, 199; 340/825.69, 825.72, 5.64; 70/279.1

(56) References Cited

U.S. PATENT DOCUMENTS

| | | | |
|---|---|---|---|
| 4,136,415 | * | 1/1979 | Blockburger ............................ 441/2 |
| 4,262,379 | * | 4/1981 | Jankiewicz ............................. 441/2 |
| 4,339,888 | * | 7/1982 | Sheng-Jung ........................... 43/26.1 |
| 4,507,093 | * | 3/1985 | Norvell .................................. 441/2 |
| 4,547,163 | * | 10/1985 | Langpaap et al. ..................... 441/2 |
| 4,569,146 | * | 2/1986 | Lowrance et al. ....................... 43/4 |
| 4,635,391 | * | 1/1987 | Early .................................... 43/26.1 |
| 4,664,559 | * | 5/1987 | Berrang ................................. 441/2 |
| 4,757,633 | * | 7/1988 | Van Cleve ............................ 43/26.1 |
| 4,834,684 | * | 5/1989 | TAllerino ............................... 441/2 |
| 5,003,514 | * | 3/1991 | Cotilla et al. .......................... 441/2 |
| 5,022,013 | * | 6/1991 | Dalton et al. .......................... 441/2 |
| 5,154,016 | * | 10/1992 | Fedora et al. ......................... 43/26.1 |
| 5,170,581 | * | 12/1992 | Lyons ................................. 43/43.12 |
| 5,184,328 | * | 2/1993 | Dumestre, III ........................ 441/2 |
| 5,699,685 | * | 12/1997 | Jahrsetz et al. ........................ 70/264 |
| 6,043,753 | * | 3/2000 | Okayasu et al. ................ 340/825.69 |
| 6,050,117 | * | 4/2000 | Weyerstall ......................... 70/279.1 |
| 6,189,256 | * | 2/2001 | Boys ................................. 43/43.12 |

* cited by examiner

*Primary Examiner*—Darren W. Ark
(74) *Attorney, Agent, or Firm*—Donald R. Boys; Central Coast Patent Agency, Inc

(57) ABSTRACT

A fishing method and apparatus is provided comprising a lure module enhanced with circuitry that is capable of releasing hooks upon detection of a signal sent from a user operated, remote device enhanced with circuitry to send the signals causing hook release. The module may be provided as a lure, as a bait-holder, or as a shape-neutral module, while the signal-sending device may be a mounted or handheld device used for example in a boat. Upon determining that a irretrievable snag has occurred, the signal sending device is used to send an appropriate remote signal to the lure or module effecting hook-release rendering the lure or module free from obstruction and retrievable. The lure or module may be reset with replacement hooks for continued fishing.

3 Claims, 7 Drawing Sheets

METHOD AND APPARATUS ENABLING REMOTE RELEASE OF HOOKS AND HOOK ASSEMBLIES TO FREE FISHING LURES

CROSS-REFERENCE TO RELATED DOCUMENTS

The present application is a Divisional application of Ser. No. 09/290,462 now U.S. Pat. No. 6,189,256, filed Apr. 12, 1999, herein incorporated in it's entirety by reference.

FIELD OF THE INVENTION

The present invention is in the field of fishing equipment, and pertains more particularly to methods and apparatus for remote signaling and releasing snagged fishing lures by releasing remotely-operable hooks or hook assemblies.

BACKGROUND OF THE INVENTION

Those familiar with and skilled in the arts of fishing, both freshwater and saltwater fishing with the use of fishing lures, will recognize the common problem of inadvertent snagging or hanging-up of such fishing lures on Submerged brush, roots, docks, or other underwater structures. There are many types of fishing lures that are vulnerable to being snagged during typical cast and retrieve operations practiced in lure fishing. For example, bottom hugging and deep diving lures, often termed crank baits, become lodged on submerged rocks, roots, tree stumps, and so on. Surface lures become snagged in waterline brush, weeds, Lilly pads, etc. Snagging is almost always by hooking a structure with hooks or hook assemblies attached to the lures.

Although some lure designs incorporate some form of snag protection such as weed guards or the like, virtually any hook-bearing fishing lure is vulnerable at some point to becoming snagged.

Typically, to free a snagged lure, a fisherman has to move his boat over the lure (if submerged), and to the side opposite where the boat was when the lure snagged in an attempt to pull the lure's hook out the same way it became lodged. Even then, more often than not, a line will break or have to be cut, and an expensive lure will be lost. Similarly, lures may be lost in dense brush or cover above or at the waterline where it is difficult for a boat to gain access, such as in shallow brush-covered backwaters. Often a decision to break the line is made by an angler faced by such a problem. Lakes, rivers, streams and in many cases salt water fishing areas have some type structure present that is capable of entrapping a fishing lure.

Many professional fisherman, particularly bass fisherman spend a considerable sum replacing lures lost by break-off or cut line. As lures become more expensive, the prospect of losing them becomes increasingly intolerable. Novice and professional alike will attest to the frustration of losing a valuable fishing lure to underwater structure or dense brush.

What is clearly needed is a method and apparatus for remotely freeing a snagged fishing lure without breaking line or requiring extensive de-entanglement efforts.

SUMMARY OF THE INVENTION

In a preferred embodiment of the present invention a fishing apparatus is provided comprising a body having an interface for attaching a fishing line; a controller including a signal monitor within the body; and a normally-closed, remotely-operable hook clasp for retaining a hook or hook assembly. In response to receipt of a release signal by the signal monitor the controller causes the hook clasp to open to release the hook. In some embodiments the controller and class are housed in a neutral module, and a lure may have a bore or other interface to engage the module. Signals may be sonic, electrical, or electromagnetic, such as RF radio. There may be a single or multiple hook clasps.

In another aspect of the invention a hook release module for a fishing lure is provided, comprising a casing for housing and supporting internal components; a controller within the casing including a signal monitor; and a normally-closed, remotely-operable hook clasp extending from the casing for retaining a hook or hook assembly. In response to receipt of a release signal the controller causes the hook clasp to open to release the hook. The signal monitor may respond to low-frequency sound, electrical, or wireless signals. There may be single or plural hooks and clasps.

In another aspect of the invention a fishing lure system is provided, comprising an apparatus comprising a body having an interface for attaching a line, a controller including a signal monitor within the body, and a normally-closed, remotely-operable hook clasp for retaining a hook or a hook assembly; and a remote signaling apparatus. In response to receipt of a release signal from the signaling apparatus the controller causes the hook clasp to open to release the hook. The clasps and controller may be housed in a neutral module adapted to a lure or bait holder. There may be a single or multiple clasps for hooks.

A signaling system in embodiments of the invention comprises a user input for initiating a signal; a signal generator for providing a signal in water; and a signal controller responsive to the user input for driving the generator to generate at least one of plural possible signals. In another aspect a signaling system for sending a hook-release signal to a fishing lure is provided, comprising a user input for initiating a signal; a sonic signal generator for providing a low-frequency signal in water; and a signal controller responsive to the user input for driving the generator to generate at least one of plural possible signals. In some embodiments the signal generator is submersible, and generates sonic signals in water. In some embodiments the signaling system is integrated with a fish-finder system.

In yet another aspect a method for releasing a snagged fishing lure is provided, comprising steps of (a) generating a signal to the snagged fishing lure; (b) receiving the generated signal at a snagged releasable lure; and (c) activating a normally-closed remotely-operable hook clasp in response to the received signal, thereby releasing a hook or hook assembly and releasing the snagged lure. The signal may be a wireless signal or a sonic signal generated in water.

In yet a further aspect of the invention a fishing apparatus is provided comprising a body having an interface for attaching a fishing line, and a sound or electromagnetic wave-emitting module, wherein the sound or velectromagnetic wave-emitting module emits a sound or electromagnetic wave for attracting fish. There may be in this embodiment a remote signaling apparatus, wherein the remote signaling apparatus sends signals defining different sounds or electromagnetic waves to drive the sound or electromagnetic wave-emitting apparatus to emit.

With this invention for the first time a lure hook-release capability controllable by a fishing person is provided allowing expensive lures and the like to be remotely released from snags so the lures may be retrieved and reused. Embodiments of the invention are taught in enabling detail below.

DESCRIPTION OF THE PREFERRED EMBODIMENTS

In a preferred embodiment of the present invention, a unique fishing lure is provided and adapted to disengage from attached fishing hooks or hook assemblies upon receiving a user-activated signal from a remote signal-sending device. The method and apparatus of the present invention in various embodiments is described in enabling detail below.

Figure 1A:
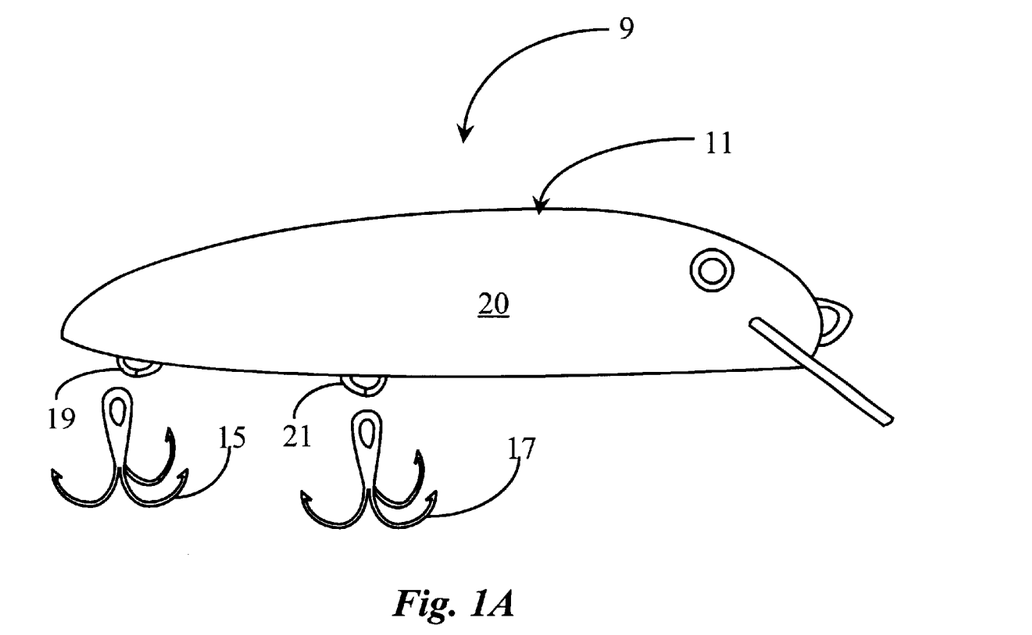
FIG. 1A is an elevation view of a hook-release fishing lure according to an embodiment of the present invention.

FIG. 1A is an elevation view of a hook-release-fishing lure 9 according to an embodiment of the present invention. Lure 9 is preferably manufactured from plastic, however, wood, balsa, cork, metal, or any other type of construction material used for manufacturing fishing lures may be used. In this example, lure 9 is a minnow-imitation medium-diving lure such as the well-known Rapala minnow®. In other embodiments, however, other imitative shapes may be used in the manufacture of lure 9 such as floating minnow, frog, crayfish, and a wide variety of other known lure imitations, or imitations of larger bait fish for saltwater lures, for example.

Lure 9 in this embodiment has a body 11 comprising recognizable features that are familiar for general types of fishing lure such as a dive plate, false eyes, and an eyelet for attaching fishing line, etc. Lure bodies of differing types will, of course, exhibit differing features. Existing lure designs as well as new lure designs and features may be incorporated into the design of lure body 11 without departing from the spirit and scope of the present invention.

Body 11 in this embodiment encapsulates internal components, circuitry, and clasp mechanisms to enable signaled release of treble hooks 15 and 17 (shown detached). Hooks 15 and 17 may be manually attached to lure 9 by way of mounting clasps 19 and 21, which are provided for the purpose. Clasps 19 and 21 may be manufactured from stainless steel or other suitable metals. Clasps 19 and 21 are, in this example, remotely-operable clasps that may be opened and closed by a signal from an on-board controller.

Hooks 15 and 17 may be manufactured from stainless steel or other known metals (or other suitable materials) used in manufacturing fishing hooks and hook assemblies. In one embodiment, hooks 15 and 17 are manufactured from a composite steel that quickly degrades and dissolves in water such that many released hooks do not promote a danger to persons entering the water shared by fisherman, or otherwise lend to pollution. Hooks 15 and 17 may be purchased separately in quantities sufficient to supply a fisherman with replacement hooks for reattaching to lures after releasing original hooks or hook assemblies. Likewise, standard treble, dual, and single prong lure hooks already available in the market may be used as replacement hooks.

In some embodiments clasps 19 and 21 are substantially straight rather than arcuate as shown, wherein a retractable pin engages a pin receptacle, accomplishing the described purpose. Of many possible pin-release mechanisms that are generally known in the art, at least one example providing some detail is described below.

Figure 1B:
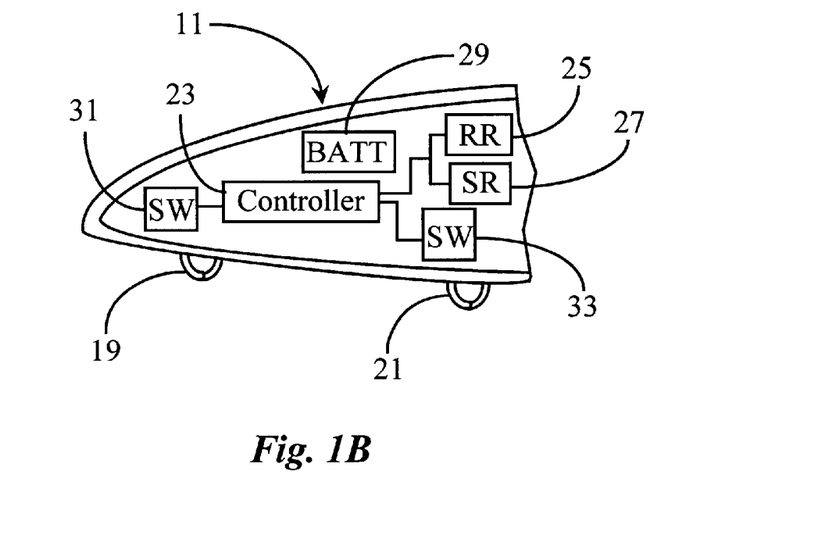
FIG. 1B is a diagram of internal elements of an encapsulated release module of the lure of FIG. 1.

FIG. 1B is a cutaway view of body 11 of FIG. 1 illustrating various internal components according to an embodiment of the present invention. As previously described the internal elements are encapsulated in the body to protect circuitry form elements such as exposure to water. Body 11 may, in some embodiments, be largely hollow (except for required circuitry and pin mechanisms) and buoyant by virtue of trapped air. In another aspect of the present invention, body 11 may be weighted such that it will sink when placed in water. Varying levels of buoyancy may be provided with addition or subtraction of weight, construction of different materials, and so on. In this way, hook-release elements may be manufactured with the appropriate properties (variations of the float/sink theme) for the type of lure expected to be used. The exact design of body 11 will depend in part on the type and planned function or action of lure 9.

Body 11 has a controller 23 mounted therein providing hook-release function to fishing lure 9 of FIG. 1A. Controller 23 is specifically dedicated to controlling connected switch mechanisms 31 and 33 based on user input (signals) sent to the lure. The electrical elements are powered, in this example, by a connected battery 29, which may be a simple watch battery or some other suitable sort. In other embodiments, a rechargeable power cell may be used instead of battery 29.

In the embodiment shown a radio-receiving module (RR) 25 is provided and adapted to receive a radio signal sent from a remote sending device that is not shown here. A sonar-receiving module (SR) 27 is also provided to receive a sonar signal sent from the same or another remote sending device. In other embodiments one or the other, but not both of these signal receivers may be used. In still other embodiments a signal may be provided over the fishing line or a separate connected line, or by another wireless method and apparatus.

Switch mechanisms 31 and 33 are connected to and are enabled to operate mechanical means (not shown) for actuating clasps 19 and 21. For example, if module 13 is snagged underwater, then a sonar signal is sent from the remote sending device and received by SR 27, which communicates the signal to IC 23. IC 23 makes a decision based on the provided signal parameters to actuate one or both switch mechanisms 31 and 33. Upon actuation the chosen switch mechanism(s) 31 and/or 33 cause clasps 19 and 21 respectively to open, thus releasing attached hooks or hook assemblies such as hooks 15 and 17 of FIG. 1A. If, however, module 13 is snagged above the waterline, a radio signal rather than a sonar signal is sent from the remote unit and is received by RR 25. The signal is then communicated to IC 23. IC 23 then activates the appropriate switch mechanisms based on signal parameters as described above. More detail about the remote sending device and pin mechanisms is provided below.

Figure 2:
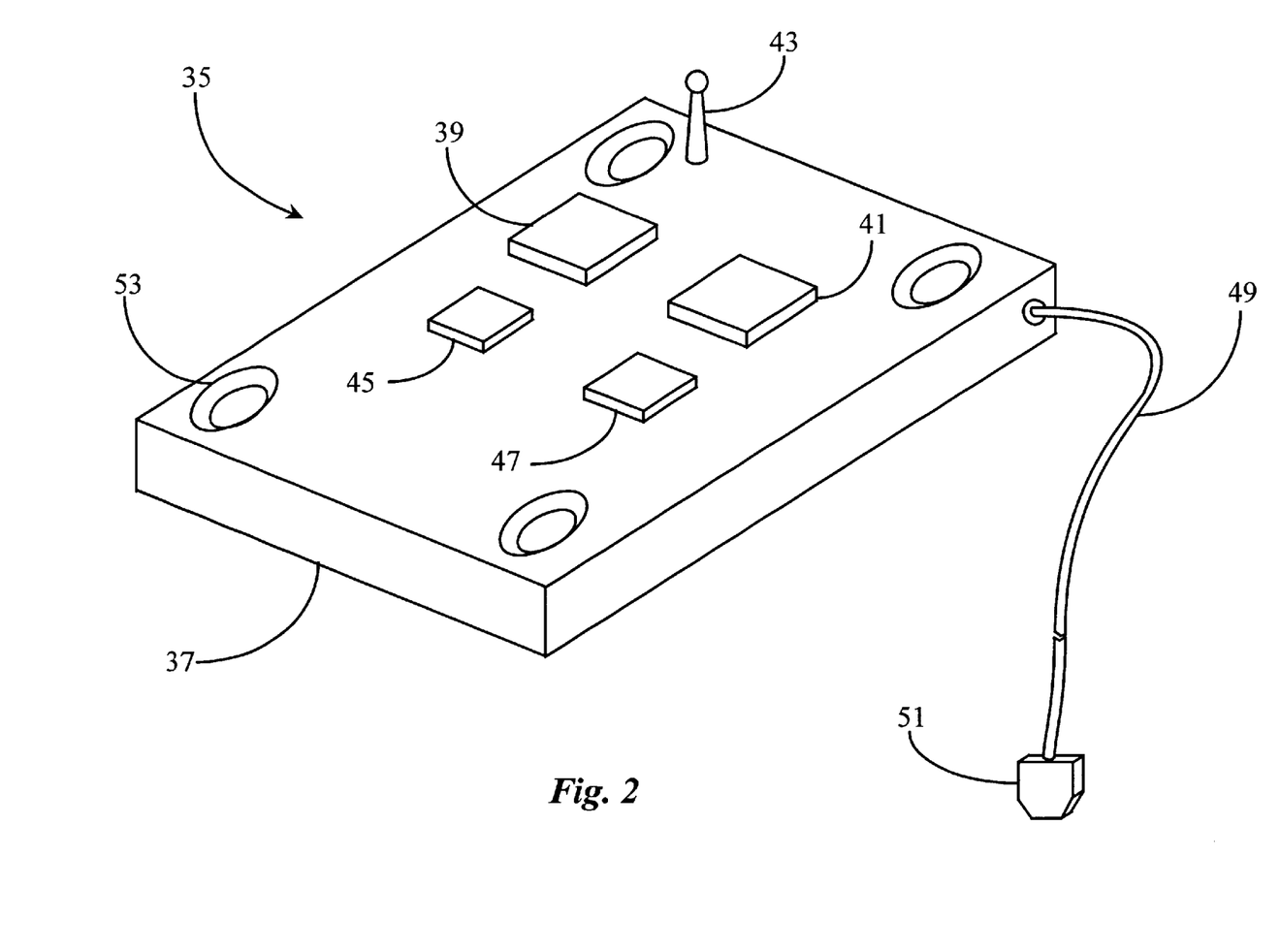
FIG. 2 is a perspective view of a signal-sending device according to an embodiment of the present invention.

FIG. 2 is a perspective view of a dual-mode-signaling device 35 according to an embodiment of the present invention. Signal-sending device 35, as was previously described, is capable of communicating with a hook-release lure such as lure 9 of FIG. 1B by sonar and/or radio signal. In this sense, sending device 35 has a dual-mode capability. Sending device 35 has a casing 37 that is adapted to support and enclose required circuitry and components. Casing 37 may, if desired, be made watertight to protect internal components from the elements such as water. Casing 37 may be manufactured from a durable polymer, aluminum, metal, or any other suitable material. Casing 37 may be provided with a means for access to internal components for the purpose of allowing for maintenance and repair or the like.

Device 35 has a sonar-sounding transducer 51 connected to a suitable cable 49 that is long enough to allow unit 51 to be placed underwater for sending sonar signals to a lure. An activation button 41 is used to activate internal elements to send the sonar signal. Device 35 also has a radio antennae 43 to direct a radio signal sent to module 13 in case of above-water snags. A button 39 is provided for the purpose of activating the radio signal.

A second row of buttons 45 and 47 may be provided, in one embodiment, to address which hooks on module 13 will be released upon signal activation. This enhancement may be provided in an embodiment wherein two or more attached hooks may be released alternatively. For example, button 47 may activate a signal to cause release of a rear-attached hook whereas button 45 may activate a signal to release a center-attached hook and so on. Buttons 47 and 45 are not required to practice the present invention as in some embodiments, one generated signal will release all attached hooks of one lure simultaneously. In the case of releasing alternate hooks, buttons 39 and 41 are used to designate the type of signal used (sonar or radio), and buttons 45 and 47 actually activate the signal effecting release of the appropriate hook.

In a preferred embodiment of the present invention, each controller 23 is programmed to respond to a unique set of signals (sonar and radio) sent by device 35. A unique signal-set is therefore specific to one manufactured lure in this embodiment. A large number of lures may be manufactured and configured to sending devices without repeating a signal set. In this way, it will be unlikely that one sending device 35 will inadvertently cause hook release on a module that is specific to another sending device. In this situation, more than one fisherman simultaneously practicing the present invention in close proximity to one another, such as from two boats fishing close together, will not trigger release of each other's lures with their individual sending devices.

In one embodiment, a capability may be provided to temporarily program one sending device such as device 35 to incorporate specific signal-sets specific to separate modules configured to another sending device such that more than one fisherman may use one sending device for the shared devices. This enhancement may be provided in the form of a plug-in module or smart card that contains the unique signal set that is specific to a specific module. By plugging in the module or card, a user may temporarily program that signal set into memory in device 3 5 and assign an available set of buttons for sending the unique signal-set to his module. A plurality of sending buttons may be provided for this purpose. For example, eight buttons (four sonar and four radio) might be required for four fishermen using one lure each to share one sending device. A means such as a displayed name tag or other identification may be provided during programming so that a particular user may be reminded via LED or other type of display, which set of buttons controls his module. There are many configuration possibilities.

An additional advantage to an ability of temporarily programming more than one unique signal-set to device 35 as described above, is that a single user may program and assign more than one lure such as might be the case when a user is simultaneously trolling (method of fishing by dragging a lure behind a boat) with more than one line. In this case, if one lure becomes snagged while trolling, for example, a user simply depresses the button assigned to that lure releasing the hooks and enabling the user to reel in the salvaged lure without stopping the boat or otherwise disturbing a lure on his or her other line.

In this example, sending device 35 is provided in a form that may be mounted in a suitable mounting location such as on a trolling motor, the arm of a mounted and rotatable fishing chair, or at other convenient mounting locations. Four mounting holes 53 are provided and adapted for the purpose. In a preferred embodiment, device 35 is adapted to be mounted to a platform apparatus that may be rotated in a position to provide maximum signal to a snagged lure such as lure 9 of FIG. 1A. Such apparatus may be provided and specifically adapted including having an extendible portion of the apparatus that may be lowered into the water from a position on a boat-mounted platform. Trolling motors and some depth finders generally have a platform surface (for mounting accessories), a portion that extends into the water, and are generally rotable rendering such apparatus a logical choice for existing mounting locations for supporting device 35.

In an alternate embodiment, sending device 35 is a hand held apparatus rather than a mounted apparatus. In this case, simply pointing device 35 in the direction of a snagged fishing lure will be sufficient to maximize the hook-release signals for radio. In a hand-held version, sonar unit 51 must still be submerged in the water in order to send sonar signals.

In other embodiments of the present invention the elements of a signal-sending device according to the invention are incorporated with a depth-finder or a fish-finder apparatus.

It is not required that the method and apparatus of the present invention be practiced from a boat or other floating vessel used in fishing. For example, a user fishing from the shore of any fishable body of water or wading a stream while fishing may practice the present invention with a version of sending device 35. Moreover, a live bait holder (not shown) may be adapted similarly to lure 9 of FIG. 1A to enable hook-release. Such a bait holder could have an inconspicuous cylindrical shape that would, perhaps, be weighted for fishing on the bottom. The bait holding hook could be attached to the encapsulated cylinder in the same way as hooks 15 and 17 are attached to lure 9 in FIG. 1A. A drop line may also be used to allow for extending the hook away from the release module. In this case, the release would include the hook, line, and swivel connecting the line to the module. Device 35 incorporates a variety of circuitry to enable practice of the present invention. Internal components are described in enabling detail below.

Figure 3:
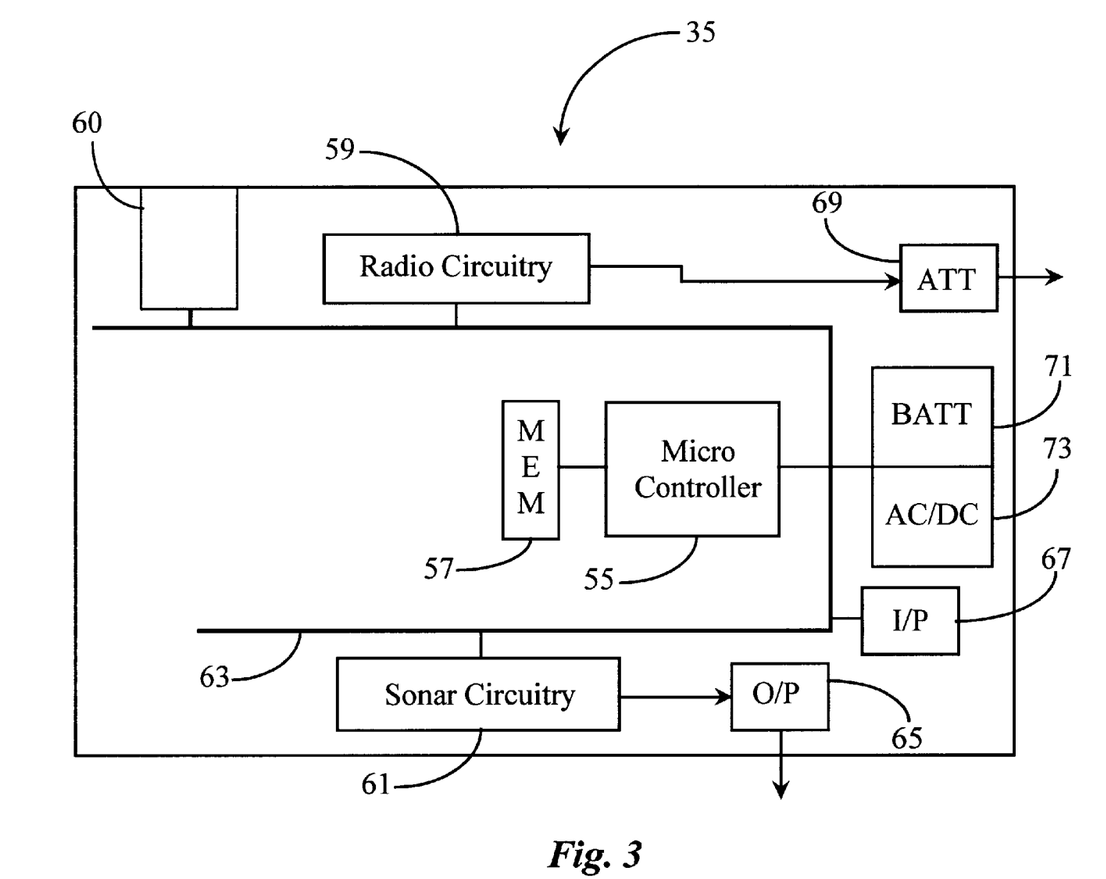
FIG. 3 is a block diagram illustrating internal circuitry of the signal-sending device of FIG. 2.

FIG. 3 is a block diagram illustrating internal circuitry of device 35 of FIG. 2. Device 35 is, in a preferred embodiment, self contained and powered by a rechargeable battery (BATT) 71. Battery 71 may also be replaceable, rather than a rechargeable battery. An AC/DC input 73 is provided and connected to battery 71. Input 73 allows power from a wall outlet or another suitable power source to enable recharge of battery 71. In addition, power may be supplied to unit 35 by way of a boat's electrical system, or boat-motor battery in such a way as to bypass use of battery 71. The required connection apparatus and power supply cables would, of course, be required in this embodiment.

A microcontroller 55 is provided to manage functions of device 35 such as switching from sonar to radio signal, managing several assigned input parameters such as would be the case with added fisherman having additional lures, and so on. Microcontroller 55 is connected to a bus structure 63 that manages communication to other connected components. A memory module 57 is provided to store input parameters such as signal-sets, switch parameters, and so on. Memory 57 may contain a mixture of volatile and non-volatile memory as may be required for preserving some parameters but not others when device 35 is not in use or powered on.

Radio circuitry 59 is provided and connected to bus 63 for the purpose of enabling device 35 to send radio signals upon user activation through an input (I/P) module 67 also connected to bus 63. Radio circuitry 59 contains all of the required components necessary for achieving one-way communication to a lure module such as module 13 of FIG. 1B. A radio antenna (ATT) 69 is provided to enable concentrated direction of the emitted radio signals.

Sonar circuitry 61 is provided and connected to bus 63 for the purpose of enabling device 35 to emit sonar signals upon user activation through I/P 67, which is also connected to bus 63 as was previously described. Sonar circuitry 61 contains all of the required components for enabling one-way sonar signaling to a lure. A sonar output (O/P) module 65 is provided and adapted to direct generated sonar-signal output (directional arrow) to a cable and connected sonar sounding device such as cable 49 and sonar transducer 51 of FIG. 2.

When device 35 is powered on, and a snag occurs with a device-registered lure such as lure 9 of FIG. 1, a user effects book release by depressing an appropriate button or other initiation device on device 35. The input signal reaches controller 55, which then consults memory 57 to determine which circuitry, sonar (61), or radio (59), to activate. When the appropriate circuitry is activated, memory 57 is again consulted for the appropriate signal pulse assigned to the particular snagged lure. Only the size of memory and number of dedicated input buttons, such as button 41 of FIG. 2, limit the number of unique signal-sets that may be programmed into memory 57.

A memory-card slot 60 is provided in some embodiments and connected to bus 63. Slot 60 is to accept a smart card or other memory module for the purpose of temporary input of additional signal-sets as described above in an embodiment with reference to FIG. 2. Memory cards containing unique signal-sets of associated lures may be provided at the time of purchase of the lures. In this way, other fisherman may temporarily program their lures signal-sets into a common device 35 for the purpose of sharing one sending device.

In an alternative embodiment of the present invention, signal-sending device 35 may be used for a purpose additional to hook release. A small sound-emitting or electromagnetic pulse-emitting device may be installed in a lure such as lure 9 of FIG. 1B. Such a device in this embodiment is connected to controller 23 of FIG. 1B, as are solenoid switch mechanisms 31 and 33. A unique signal-set is attributed to the sound or pulse-producing device. The same signal-set may be programmed into sending device 35 and assigned to a special button such that a fisherman fishing with the enhanced lure may at any time trigger the sound/pulse producing device to function for a preset time. This enhancement allows fish attracting sounds, vibrations and or electromagnetic pulses to be incorporated into the action of the lure at the fisherman's discretion.

In alternative embodiments a sound-emitting device in a lure may be driven to produce a library of sounds stored in memory 57 of device 35. Specific sounds in the library may be user-selectable, or the sounds may be played in a round-robin fashion, and a user is enabled to stop the changing selection according to results.

In yet another embodiment of the invention a pre-stored (in lure 9) sound r electromagnetic output is periodically played by the lure without input from the signaling device.

Figure 4:
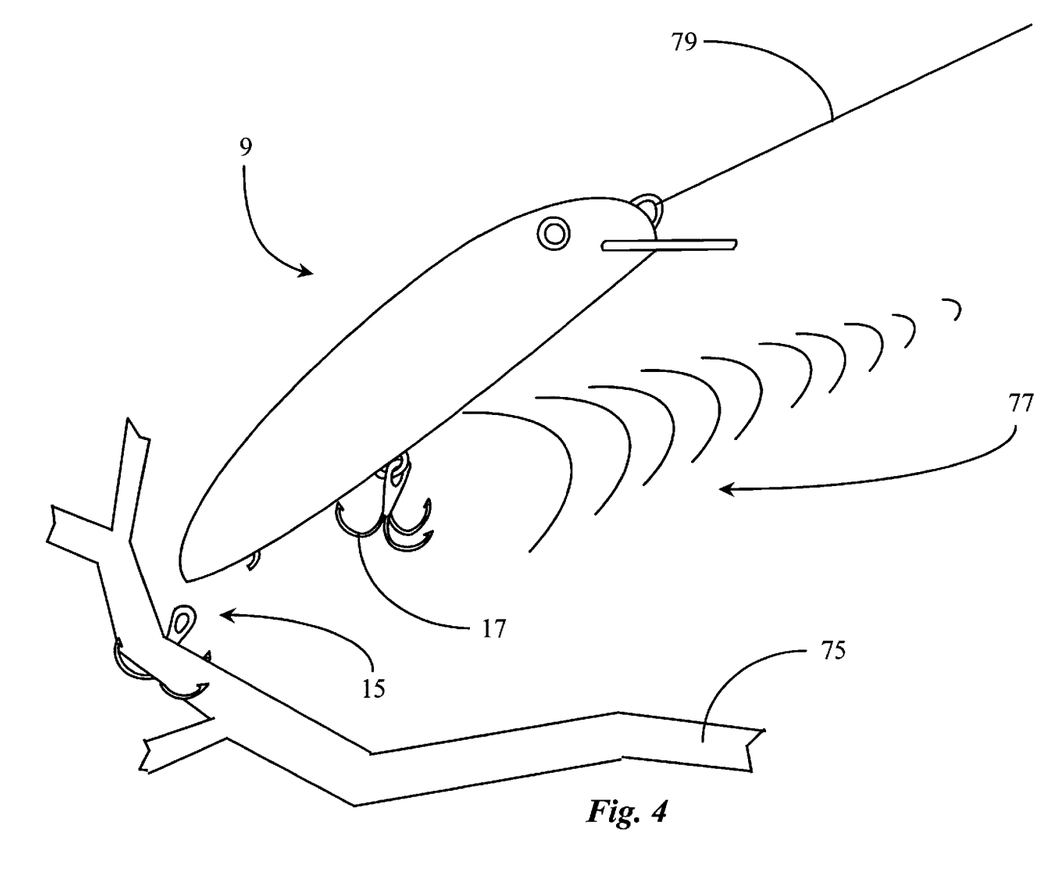
FIG. 4 is an elevation view of the hook-release-lure of FIG. 1 in the process of disengaging from a snagged hook.

FIG. 4 is a plan view of lure 9 of FIG. 1 in the process of disengaging from snagged hook 15. In this embodiment lure 9 is illustrated underwater and being released from a typical snag situation wherein hook 15 has become snagged in a root 75. In this case, alternate hook-release method is employed. A fisherman must guess which hook, 15 or 17, is snagged on root 75. A logical first choice would be rear hook 15, however in actual practice one or both hooks 15 and 17 may have an equal chance of being snagged. A fisherman applies tension to a connected fishing line 79 to feel the snag and to pull lure 9 free at the moment of hook release. A sonar signal 77 is detected by lure 9 causing release of hook 15, which in this case, was the snagged hook. The method for determining which of a multiple number of attached hooks is snagged is entirely empirical. However, some intelligent guesswork may be attributed to some types of lures based on the known location of hooks and known action of the lure, which in some instances, may make a particular hook of that lure more likely to become snagged. In other instances, there will only be one hook on the lure eliminating guesswork. In still another instance, all hooks are simply released regardless of which one is snagged.

It will be appreciated by one with skill in the art that a lure such as lure 9 will likely be more expensive to replace than a standard fishing lure because of added components. Releasing all of the hooks, though likely freeing the lure, will not always guarantee release of such a lure if it is wedged, wrapped around, or otherwise entangled beyond function of the hooks. There are some precautions that a fisherman may take to help insure against this possibility. One technique is using a suitably strong fishing line. For example, line 79 may be a special type of line known in the art as spider wire. Such line is available and recommended for fishing in snag-prone waters. Other precautions are obvious such as insuring that a lure is tied securely to line 79, and that the module portion of the lure, if removable, is securely locked to the front body of the lure before casting.

In an alternative embodiment, a chip may be installed inside module 13 such that if separated from the fisherman, a horning signal may be activated and received by separate circuitry installed in a sending unit such as unit 35. Such technology is available in such as metal detection devices and may work above or below the water line within suitable distances. In this ways a fisherman may sight approximately where the lure was lost and possibly pick up an activated horning signal when maneuvering close to the location. If it is found in shallow water or in accessible brush, a manual recovery attempt may be worth the effort.

Figure 5:
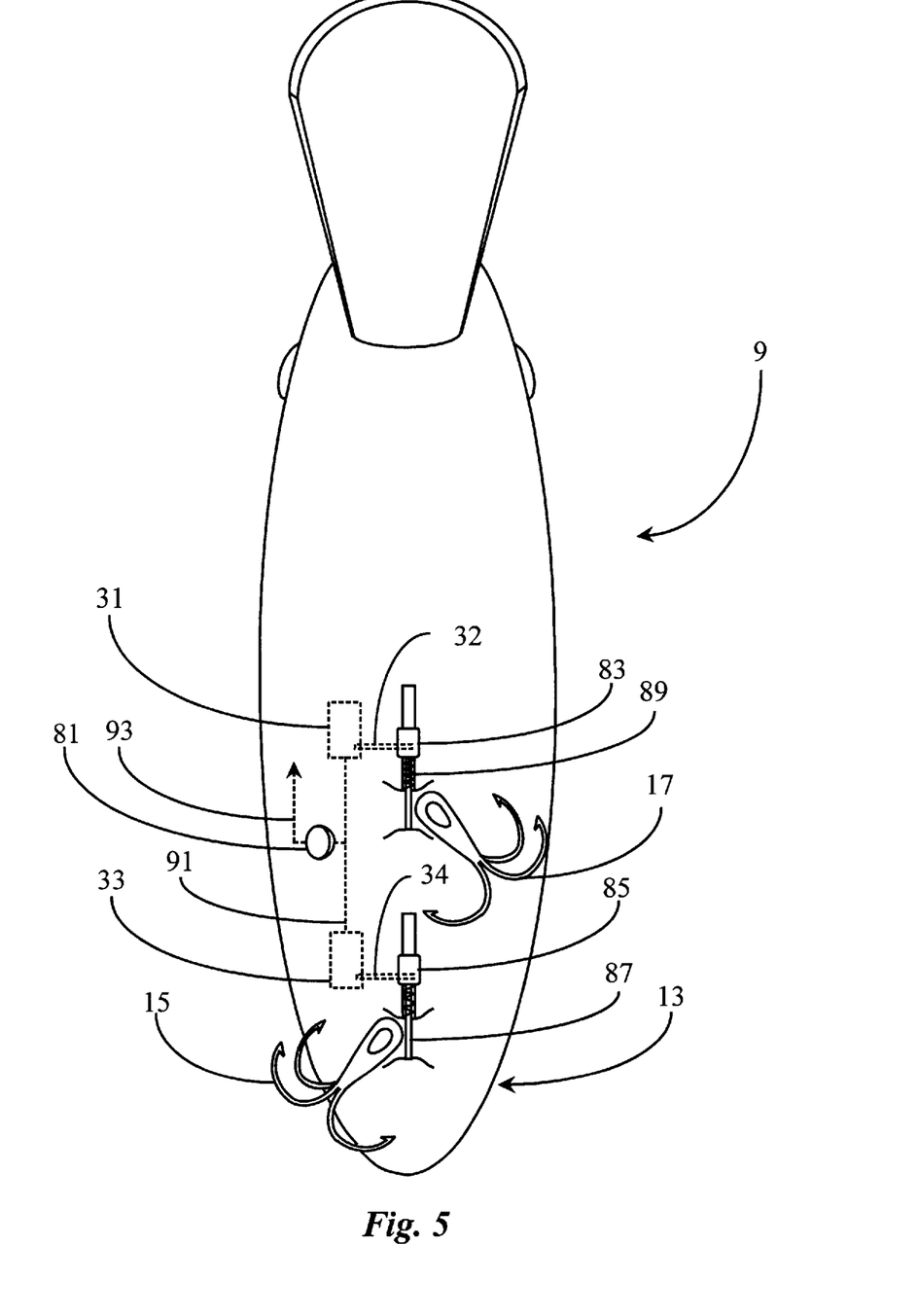
FIG. 5 is an underside view of the hook-release lure of FIG. 1 illustrating exemplary hook-reset and release components according to an embodiment of the present invention.

FIG. 5 is an underside view of lure 9 of FIG. 1 illustrating exemplary hook-reset and release mechanisms according to an embodiment of the present invention. Lure 9, shown from underneath, has an exemplary spring-loaded hook-reset and release capability. This embodiment illustrates a previously described example (FIG. 1A) wherein indents and straight pins are used rather than arcuate pins.

Pins 87 are illustrated as bridging horizontally-placed indents provided at both hook-mount locations on lure 9 such that hooks 15 and 17 (shown detached) may engaged. Pins 87 are manufactured of suitable non-corrosive steel such as stainless. Each pin 87 is retractable into one surface of each indented formation. Pins 87 extend through positioned springs 89 (one at each location) and are rigidly affixed at one end to user operable reset levers 83 and 85 such that spring relaxation acts to retract pins 89 into the appropriate indent surface (spring side) thereby creating an opening in the bridge for hooks 15 and 17 to drop out. User operable reset levers 83 and 85 are used to urge pins 87 back into locked location against a spring force exerted by springs 89 against each lever. Reset levers 83 and 85 protrude through an elongated track provided at each location such that a user may operate them by hand. When locked into position, the free ends of pins 87 are urged partially into an opening placed in the opposite indent surfaces (side opposite spring) thus bridging the gap produced by the indents.

Lock pins 32 and 34 (one at each mount) are provided and adapted to lock reset levers 83 and 85 into an appropriate spring-tensioned position at which indent gaps are bridged by pins 87. Each lock pin 32 and 34 is mechanically connected to solenoid switches 31 and 33 respectively. A user operable reset button 81 having a line to power 93 provides automatic reset action to lock pins 32 and 34. A reset line 91 connecting reset button 81 to both solenoid switches 31 and 33 provides a switch activated means to lock each locking pin such as pin 32 into a respective reset lever such as lever 83, locking hooks 15 and 17 into mounted position.

In practice, a signal sent by a sending unit such as unit 35 causes one or both of switches 31 and 33 to retract lock pins 32 and 34 from their positions. This action releases levers 83 and 85 to spring tension provided by springs 89. As the springs extend, pins 87 are retracted thereby releasing hooks 15 and 17.

To reset with new hooks, a user positions a replacement hook into position between indent surfaces and urges pin 87 into position through the eye of the hook by manipulating a lever such as lever 83 against spring tension. When the pin and lever are in position, the user depresses reset button 81 while holding lever 83 to cause a switch such as switch 31 to engage lock pin 32 into an opening lever 83 effecting a lock. The hook is now in position and can be released only by signal from the sending unit. The same process is repeated to mount subsequent hooks. In the case of two hooks as is illustrated here, reset button 81 may be enabled to activate one switch at a time such as by toggling to one side (first switch) and then the other (second switch).

The inventor intends that this illustrated reset and release method be construed as only exemplary of many possible release-reset methods and apparatus that are generally known in the art and available to the inventor. Arcuate pins will require a different method of release and reset, perhaps via a spring loaded and switch activated pin rotation method. It will be apparent to one with skill in the art that other schemes are also possible.

Figure 6:
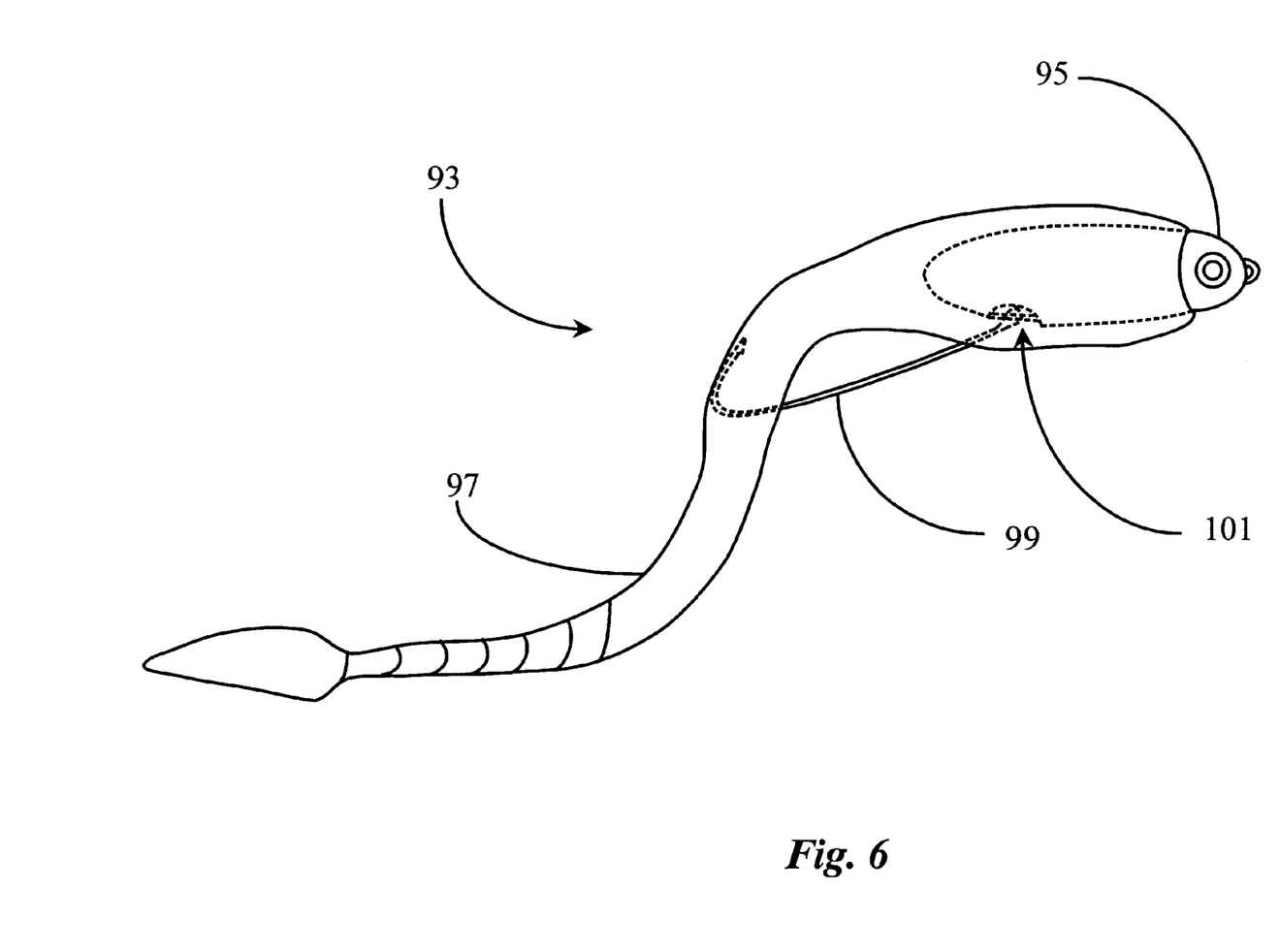
FIG. 6 is a plan view of an artificial soft-bodied lure wherein the jig-head is a hook-release module according to an embodiment of the present invention.

FIG. 6 is an elevation view of an artificial soft-bodied lure wherein the jig-head is a hook-release module according to an embodiment of the present invention. Application of the present invention may be made to most types and styles of bodied lures as previously described. In this example of versatility, a jig-style lure 93 comprises a soft-bodied plastic bait 97 attached to a weighted jig-head 95, which doubles as a lure module similar in function to lure 9 of FIG. 1B.

Module 95 (jig-head) is weighted as required to achieve desired sink rate for slow-retrieve fishing of plastic baits. Like other jig-heads, module 95 has a streamlined shape to facilitate attachment of plastic bait 97 and optimal swimming action with the bait attached. A single hook 99 is provided in this embodiment and mounted at a suitable mounting location 101. Module 95 operates in the same way that elements of lure 9 of FIG. 1B operates. The only difference is that only one hook-release switch is required.

In this example, module 95 may be one weighted capsule with false eyes and an eye for line-attachment as is illustrated. In another embodiment module 95 may simply screw or snap on to a lead jig-head adapted for the purpose. There are many such possibilities within the spirit and scope of the invention.

Figure 7:
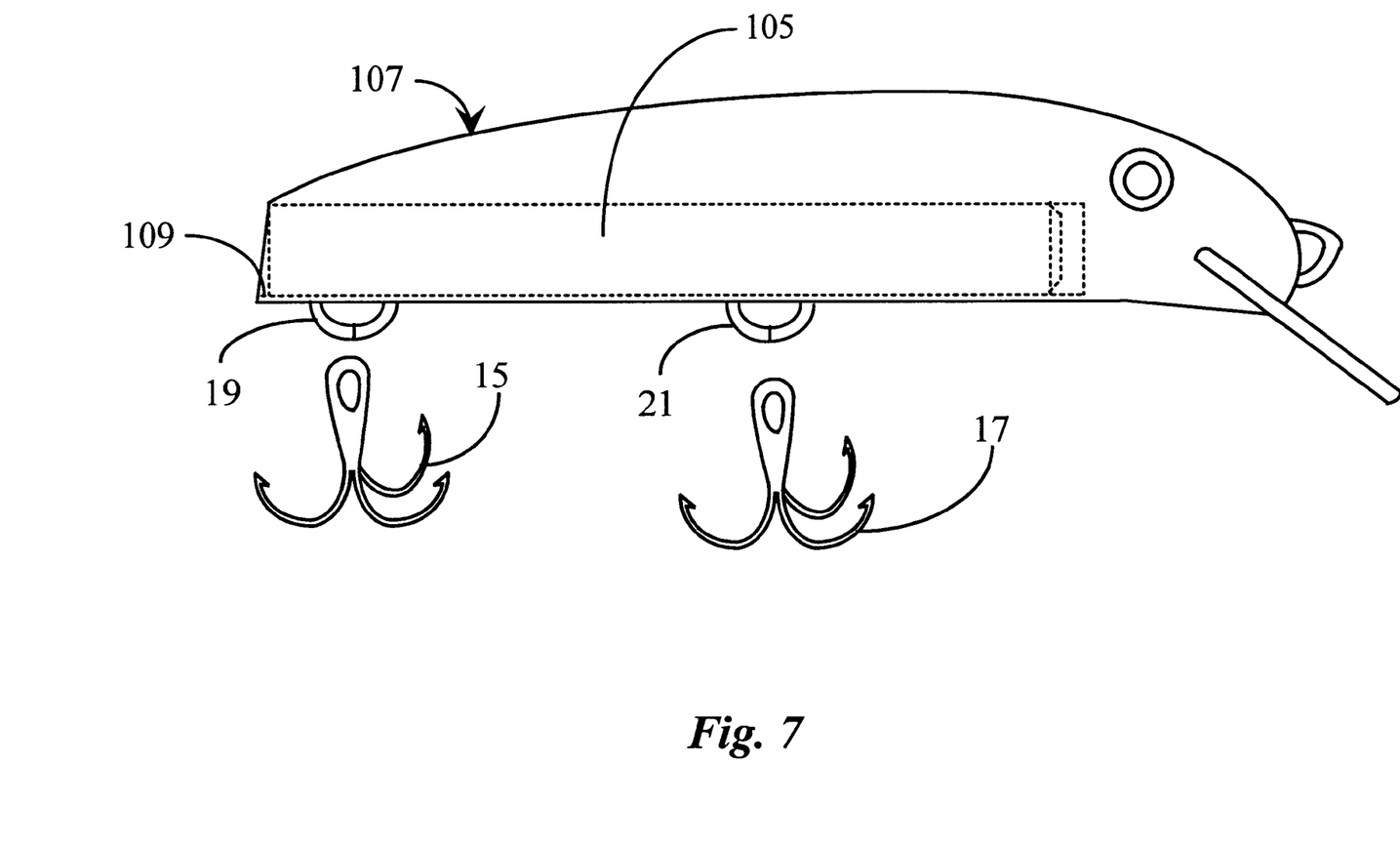
FIG. 7 is an elevation view of a hook-release lure according to the invention wherein the hook release elements are incorporated in a replaceable module.

FIG. 7 illustrates another alternative embodiment of the invention wherein a cylindrical module 105 is mated with a lure body 107 having a bore 109 of a diameter to accept module 105. Module 109 has all of the internal elements described as encapsulated within lure 9 of FIG. 1A, including two remotely-operable clasps 19 and 21. A slot along the bottom of lure body 107 into bore 109 allows clasps 19 and 21 to extend to the outside of the lure body. In this embodiment, one may have a variety of lures of different sizes, colors, styles and the like, each with a standard bore allowing insertion of a module 105 to configure the lure as a remotely-releasable device according to an embodiment of the present invention.

It will be apparent to one with skill in the art that the method and apparatus of the present invention may be integrated with virtually all different types of hook-bearing fishing lures without departing from the spirit and scope of the present invention. For example, floating modules may be integrated with hard-bodied and soft-bodied floating lures constructed from a variety of materials. Deep-diving and medium-running crank style lures and jig-style soft-bodied bottom-hugging lures are also covered. The method and apparatus of the present invention may also be used in conjunction with live-bait fishing. There are limitless possibilities applicable to almost every possible fishing situation wherein hooks are used.

In one application of the present invention, the hook-release method may be used to safely release an unwanted or illegal game fish without cutting the line or requiring landing and unhooking the fish. In still other embodiments of the present invention, ICs dedicated to other functions beside hook-release may be incorporated in addition to hook-release function. For example, an IC may be included in the hook-release module and connected to a sound device for emitting bait-emulating sounds. There are many possibilities. Therefore, the method and apparatus of the present invention should be afforded the broadest scope possible. The spirit and scope of the present invention is limited only by the claims that follow.

What is claimed is:

1. A hook release module for a fishing lure, comprising:
   a casing for housing and supporting internal components;
   a controller within the casing including a signal monitor;
   a hook or hook assembly having an eye; and
   a normally-closed, remotely-operable hook clasp extending through the eye of the hook or hook assembly and retaining the hook or hook assembly to the casing;
   wherein in response to receipt of a release signal the controller causes the hook clasp to open, disengaging the hook clasp from the eye of the hook or hook assembly.

2. The hook release module of claim 1 wherein the signal monitor responds to low-frequency sound signals.

3. The hook release module of claim 1 comprising plural hook clasps for engaging and disengaging multiple hooks and hook assemblies wherein the controller opens all hook clasps in response to a single signal.

* * * * *